United States Patent [19]

Eggleston et al.

[11] 4,231,546
[45] Nov. 4, 1980

[54] HIGH-TEMPERATURE BIDIRECTIONAL METAL SEAL

[75] Inventors: Philip W. Eggleston; Eugene R. Taylor, Jr., both of Marshalltown, Iowa

[73] Assignee: Fisher Controls Company, Inc., Marshalltown, Iowa

[21] Appl. No.: 972,568

[22] Filed: Dec. 22, 1978

Related U.S. Application Data

[63] Continuation of Ser. No. 619,133, Oct. 2, 1975, abandoned.

[51] Int. Cl.³ .............................................. F16K 25/00
[52] U.S. Cl. .................................. 251/173; 251/306; 251/174
[58] Field of Search ............................. 137/527, 527.4; 251/304, 305, 306, 307, 308, 172, 173, 175

[56] References Cited

U.S. PATENT DOCUMENTS

| | | | |
|---|---|---|---|
| 2,934,312 | 4/1960 | Stevens | 251/175 |
| 3,077,331 | 2/1963 | Burtis | 251/173 |
| 3,077,332 | 2/1963 | Burtis | 251/173 |
| 3,153,427 | 10/1964 | Burtis | 137/527 |
| 3,260,502 | 7/1966 | Plumer | 251/308 X |

FOREIGN PATENT DOCUMENTS 1010118 11/1965 United Kingdom ..................... 251/173

Primary Examiner—Alan Cohan
Attorney, Agent, or Firm—Lawrence L. Limpus

[57] ABSTRACT

Disclosed herein are valve seals wherein an annular metallic seal member is retained in an annular recess in a valve body wall, the seal member being resiliently deformable in both axial and radial directions. A resilient annular Belleville spring portion is provided linking an inner sealing portion and an outer flange portion which is sealingly engaged by the valve body. When a valve employing this seal arrangement is closed, differential pressure acting from either direction urges a valve closure member and the seal member in a downstream direction, and forces the seal member and the valve closure member into tighter sealing engagement.

5 Claims, 6 Drawing Figures

HIGH-TEMPERATURE BIDIRECTIONAL METAL SEAL

This is a continuation of application Ser. No. 619,133, filed Oct. 2, 1975, now abandoned.

BACKGROUND OF THE INVENTION

1. Field of the Invention

This invention relates generally to seals for valves. More particularly, it relates to valve seal designs which permit improved sealing effectiveness under the influence of fluid pressure acting upon the valve.

2. Description of the Prior Art

Heretofore, in valves having a pivotable valve closure member which includes a segment of a sphere as a sealing surface, e.g. butterfly or ball valves, it has been common to employ valve seals of many different configurations and materials. One approach, disclosed in U.S. Pat. No. 3,734,457 to Roos, has been to provide a valve seal ring which is of lesser inside diameter of the sealing surface of the valve closure element and which is partially restrained against radial stretching by a resilient metal hoop, whereby an interference fit is achieved between the seal and the disk resulting in compression of the seal and stretching of the hoop upon closing the disk. Still another prior art approach disclosed by Helman et al. in U.S. Pat. No. 3,608,861 and by Swain Canadian Pat. No. 695,037 has been to provide a seal member retained in a valve body recess and a rigid annular projection on the downstream side of the body recess which function as a fulcrum to limit flexure under the influence of fluid pressure to improve sealing effectiveness. These seals have included polymeric or elastomeric elements, and thus have been limited to a temperature range below the breakdown temperature of the polymer or elastomer employed.

Prior art metallic seals, suitable for elevated temperatures, are disclosed in U.S. Pat. No. 3,834,663 to Donnelly, U.S. Pat. Nos. 3,077,322 and 3,153,427 to Burtis, and Swiss Pat. No. 383,104 to Swain. Such seals are characterized by resilient expansion in a radial direction upon closure of a valve disk, and may rely on the influence of pressure acting on the seal member to enhance sealing effectiveness over some or all of the range of operating pressure.

While these and other related approaches to butterfly and ball valve seal design have proven effective in some applications, nevertheless certain problems have been encountered. In particular, valves employing prior art seal configurations have not always proven effective in bidirectional service, i.e. in applications in which the higher fluid pressure may be applied to either side of the valve. Further, such seals have been, for the most part, useful only within a limited range of operating pressures.

SUMMARY OF THE INVENTION

It is an object of this invention to provide an improved valve seal for valves having a valve closure member the sealing surface of which is a section of a sphere, such as butterfly valves or ball valves.

A further object is to provide a valve seal the effectiveness of which is increased by differential fluid pressures acting on the valve in either direction.

Another object is to provide a seal which will compensate for movement of the valve closure member under the influence of fluid differential pressure.

Yet another object is to provide a seal design which remains effective at high temperatures, and in which compensation is provided for the effects of thermal expansion, or contraction, and wear.

To achieve these objects, as well as others which will become apparent hereinafter, we provide a valve having a closure member the periphery of which includes a converging surface, this member being retained within a valve body and pivotable therein between an open and a closed position. Retained within an annular recess in the valve body wall is a metallic valve seal member, which is provided with a radially inner annular sealing portion which is in cross section a generally U-shaped channel, the innermost surface of which is of slightly lesser diameter than that of the closure member at the point of contact therewith, for sealingly engaging the periphery of the closure member when the closure member is pivoted to a valve-closing position, and which is further provided with a resilient web portion extending outwardly from the sealing portion. The web portion is surrounded by a radially-extending flange portion which is engaged by the valve body for preventing fluid flow around the outer periphery of the seal member. At, or in the vicinity of, the junction of the web and flange portions, is an annular locus of flexure points, about which the web is axially deflected when the closure member is rotated to a closed position and as differential fluid acts on the valve elements. This locus of flexure points is displaced in the direction of convergence of the closure member surface from the locus of points of contact between the closure member and the sealing portion of the seal.

In operation, when the valve closure member is pivoted to a closed position the converging surface on the periphery thereof engages the inner sealing portion of the seal member and forces the seal member to expand. In the absence of differential pressure across the valve, the sealing portion of the seal member is thus stretched radially, while the web portion functions as a Belleville spring as required to permit axial deflection and radial expansion of the seal member to accommodate the closure member, and the web portion of the seal is placed in radial compression. Under the influence of differential pressure applied from the side of the valve opposite the converging surface of the valve closure member, the closure member is moved in the direction of convergence, wedging its converging surface into the seal member in the downstream direction to increase the sealing force between the seal member and the closure member. When differential pressure is applied from the direction of convergence of the closure member periphery, the closure member is moved away from the direction of convergence, while circumferential hoop stresses in the sealing portion of the seal member induced by initial closure of the closure member cooperate with axial forces provided by the resilient web portion and further aided by the effect of differential pressure acting on the seal to maintain sealing engagement between the seal member and the closure member.

BRIEF DESCRIPTION OF THE DRAWINGS

Attention is now directed to the drawings, in which.

DESCRIPTION OF PREFERRED EMBODIMENTS

Figure 1:
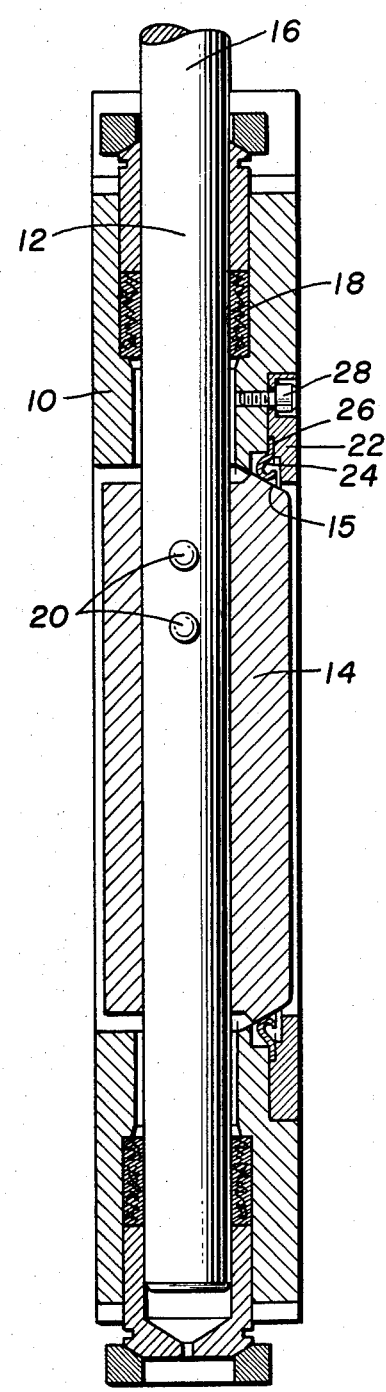
FIG. 1 is a partial cross-sectional view of a butterfly valve including a seal embodying the present invention.

In the embodiment of FIGS. 1-5, there is shown a butterfly valve having a valve body 10 within which a closure member 14 is mounted on a valve stem 12. The valve stem extends externally of the valve body at one end 16, and may be pivoted by connection at the end 16 to any conventional valve actuation means (not shown here). Suitable stem packing 18 is provided to prevent leakage of a fluid from within the valve. The closure member 14 may be secured to the valve stem 12 by any suitable means, here exemplified by pins 20. This closure member is provided with a converging peripheral sealing surface 15 which is preferably a section of a sphere.

Retained between an annular seal retainer 22 and the valve body 10 is an annular unitary valve seal member, generally designated 24. Fluid-tight sealing between the seal retainer 22, an outer peripheral flange 26 of the seal member 24, and the valve body 10 is provided by clamping the periphery 26 between the retainer and the valve body by a set of screws 28. The seal member 24 is constructed of a flexible resilient metal, for example bronze or a stainless steel, which is chemically and physically resistant to the fluid which is to flow through the valve.

Figure 2:
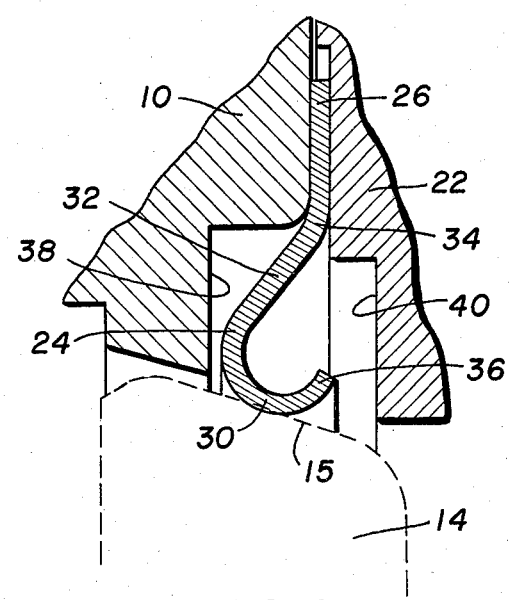
FIG. 2 is an enlarged detailed cross-sectional view of the seal of FIG. 1, showing the relative dimensions and locations of the seal elements when the valve is opened, and the valve disk when closed, respectively.

As can be more clearly seen in FIG. 2, which shows the position of the seal 24 when the valve is open, the valve seal member 24 is provided with a radially inner sealing portion 30 and a resilient flexible dished web portion 32 extending outwardly therefrom. The sealing portion 30 is of slightly smaller diameter than the surface 15 at the point of contact with the closure member 14, this latter member being shown by dashed lines to indicate its position when the valve is closed, resulting in an interference fit between these two members when the closure member is pivoted to a closed position. The sealing portion 30 is formed as an annular channel having a generally U-shaped cross section, one leg of the U being a continuation of the web portion 32 and the other leg terminating in a lip 36 which provides added strength in the sealing portion 30.

The facing surfaces of the valve body 10 and the seal retainer 22 define an annular valve body recess having a first sidewall 38 and a second sidewall 40. Preferably, the sidewalls 38 and 40 should be sufficiently separated that neither the sealing portion 30 nor the web portion 32 of the seal member 24 contacts these sidewalls as the seal is moved axially under the influence of the valve closure member 14 upon closing, or under the influence of differential fluid pressure.

Figure 3:
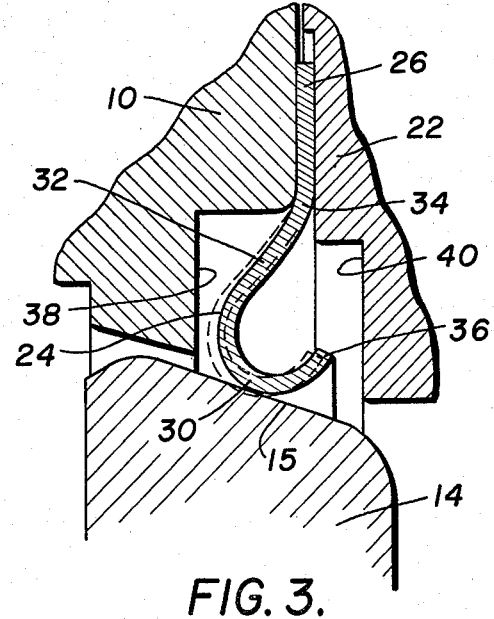
FIG. 3 is a detailed cross-sectional view of the seal of FIG. 2, shown with the disk in closed position and in the absence of differential pressure across the valve.

In FIG. 3, the valve is shown with the closure member 14 pivoted into a closed position, the sealing surface 15 thereof engaging the inner sealing portion 30 of the seal member 24. In this condition, the inner portion 30 of the seal member expands resiliently to accommodate the surface 15 of the closure member, while the dished web portion 32 is resiliently deflected axially about an annular pivot, or locus of flexure points 34 located generally at the junction of the web portion 32 and the flange portion 26 in the direction of convergence of the closure member surface 15, as can be seen by reference to the dashed lines which indicate the position of the seal 24 in its valve-open condition. Additionally, axial forces imposed upon the closure member 14 by the seal member 24 serve to take up any clearances between the closure member 14 and the valve stem 12, as well as those between the stem 12 and its support bearings.

Figure 4:
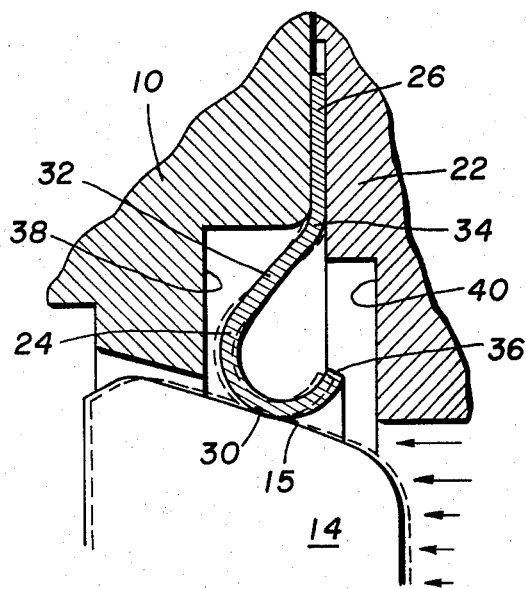
FIG. 4 is a detailed view of the seal of FIG. 2, shown with pressure applied from the side of convergence of the periphery of the disk.

Under the influence of fluid pressure differential applied across the valve of FIG. 1, the higher pressure being applied from the side of the closure member toward which the periphery 15 converges, the seal 24 and the valve closure member 14 are urged to the position shown in FIG. 4, the positions of the seal member 24 when the valve is open and of the closure member 14 when closed in the absence of differential pressure again being shown by dashed lines for comparison. Fluid pressure urges the closure member 14 away from the direction of convergence of the surface 15, which pressure acting on the seal 24 cooperates with the hoop stresses imposed by the sealing portion 30 and the axial spring forces imposed by the dished web portion 32 of the seal 24 in response to initial closure of the closure member 14, to maintain fluid tight engagement of the seal 24 with the periphery 15 of the closure member.

Figure 5:
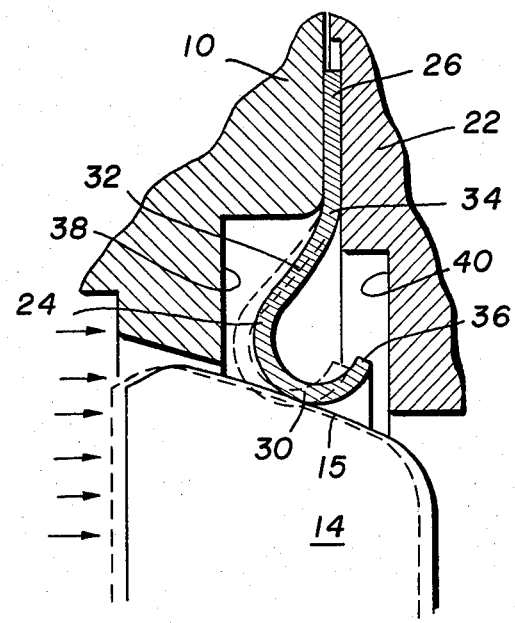
FIG. 5 is a view of the seal of FIG. 2, shown with fluid pressure applied from the opposite side.

In FIG. 5 the seal 24 and closure member 14 of this embodiment are shown under the influence of differential pressure acting toward the direction of convergence of the surface 15, and again dashed lines indicate the positions occupied by the seal 24 when the valve is open and the closure member 14 when closed in the absence of fluid pressure. In this condition, the valve closure member 14 is urged toward the direction of the convergence of the surface 15 under the influence of fluid pressure, and the surface 15 is wedged more tightly into sealing engagement with the inner sealing portion 30 of the seal member 24. The axial movement of the sealing portion 30 is limited by axial spring forces imposed by the resilient web portion 32 of the seal.

Preferably, a metal seal according to this invention is formed such that an imaginary line drawn through the pivot 34 of the seal 24 and the center of curvature of the U-shaped inner sealing portion 30, when the seal is in the position shown in FIG. 2, is substantially perpendicular to the sealing surface 15 of the valve closure member 14 at its point of intersection therewith when the closure member 14 is in a closed position. In other words, a line drawn from the point 34 through the center of curvature of the sealing portion 30 of FIG. 2 would desirably intersect the dashed line indicating the closed position of the closure member surface 15 substantially perpendicularly. By the term "substantially perpendicularly" is meant within about ten degrees of perpendicularly. Although a seal constructed according to this invention may be constructed so that such an imaginary line intersects the surface 15 in its closed position at an angle departing significantly from the perpendicular, we have found that for most applications an advantageous balance between sealing effectiveness and the torque required to rotate the valve closure member to a closed position is achieved when this angle is within about ten degrees of perpendicular. Such a relationship together with the interference fir indicated in FIG. 2 between the closure member surface 15 and the seal 24, ensures that axial and radial preloading forces will be imposed on the sealing surface 15 of the closure member 14 by the seal member when the closure member is rotated to the closed position of FIG. 3.

As has been stated before in connection with the discussion of FIG. 3, the web member 32 of this invention is axially flexible about a locus of flexure points 34 located generally at the junction of the web 32 and the flange portion 26, and this locus of flexure points 34 is axially displaced, or offset, in the direction of convergence of the valve closure member surface 15 from the region of contact of the closure member surface 15 and the inner sealing portion 30 of the seal member 24. This axial displacement of the locus of flexure points 34 is desirable because of substantially perpendicular intersection of the imaginary line drawn through the point 34 and the center of curvature of the seal channel 30 with the surface 15 of the closure member in FIG. 2 referred to above. It will be understood by those skilled in the art that the shortest distance between a point and a surface is the distance measured along a line perpendicular to the surface and passing through the point. Accordingly, when the valve closure member 14 is rotated to the closed position shown in FIG. 3 the sealing portion 30 and the web portion 32 are moved toward the direction of convergence of the closure member surface 15, and the sealing portion 30 of the seal contacts the sealing surface 15 in a region, or band of points, more distant from the flexure point 34 than the shortest distance from point 34 to the surface 15. The web portion 32 of the seal member is simultaneously placed in compression by virtue of the axial displacement, or offset, of the flexure points 34 in the direction of convergence of the surface 15 from the point of contact of the sealing portion 30 with the closure member surface 15 and by the circumferential stretching of the sealing portion 30 of the seal, along with axial deflection thereof, which stretching and deflection urge the region of contact between the seal and the closure member nearer the locus of flexure points 34. As can be seen by reference to FIGS. 4 and 5, the web portion 32 remains in compression as the valve disk and seal move under the influence of fluid pressure differential applied to either side of the closure member 14 inasmuch as the position of the seal member 24 does not move away from the direction of convergence of the surface 15 farther than its dashed-line, or "free", position. By virtue of this compression of the web 32, the effect of differential pressure applied to the valve seal 24 and closure member 14 from the direction of convergence of the closure member surface 15 tending to force the sealing portion 30 outward on the surface 15 is counteracted by forces in the web portion 32 resisting further outward compression of the web 32 as the point of contact of the sealing portion 30 with the closure member surface 15 is moved closer to the flexure point 34, as well as by hoop stresses within the sealing portion 30 of the seal as the sealing portion is forced to expand. Pressure applied to the seal 24 and the closure member 14 from the side of the valve opposite the direction of convergence of the surface 14 will likewise be counteracted by outward compressive forces in the web portion 32 as well as hoop stresses in the sealing portion 30, as the closure member 14 tends to wedge into the seal 24. The coaction of compressive loading of the web portion 32 and hoop stretching of the sealing portion 30 allows support of the sealing portion 30 by the web 32 to minimize the danger of stretching the sealing portion beyond its elastic limit, while permitting sufficient flexibility in the sealing portion to allow it to conform to the closure member surface to effect tight shutoff when the valve is closed.

The lip 36 on the generally U-shaped sealing portion 30 of the seal 24 operates in a triple capacity. First, it serves as an additional Belleville spring element, cooperating with the web portion 32 to provide additional stiffness of the seal in the axial direction. Secondly, the lip 36 adds radial strength to the sealing portion 30 to counteract the tendency of differential pressure acting from the direction of convergence of the surface 15 to "unfold" the sealing portion and force the seal in a downstream direction, causing leakage of the valve. Thirdly, provision of the lip 36 insures that the point of contact of the sealing portion 30 with the closure member surface 15 is not at the edge of the seal, minimizing the danger of stress-cracking and erosion of the sealing portion.

Figure 6:
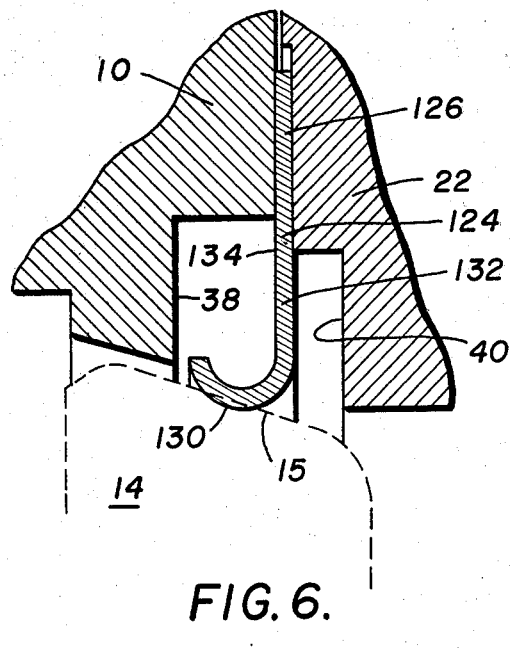
FIG. 6 is a detailed cross-sectional view of another embodiment of the present invention, showing the relative dimensions and locations of the seal elements when the valve is opened and the valve disk when closed, respectively.

Referring to FIG. 6, there is shown a second embodiment of this invention, wherein an annular web portion 132 is provided for linking the inner annular sealing portion 130 and the outer peripheral flange portion 126 of a unitary metallic valve seal 124. As in the embodiment of FIGS. 1-5, this embodiment includes a valve body 10 and an annular seal retaining member 22 for clamping the peripheral flange 126 of the seal member, and a valve closure member 14 having a converging sealing surface 15. The seal 124 is shown in the position which it occupies when the valve is open, while the valve closure member is shown by dashed lines in its valve-closed position for comparison purposes.

The annular web portion 132 of this embodiment differs from that of the embodiment of FIGS. 1-5 in that it is not dished, but is a radial extension of the flange portion 126 of the seal 124. In the vicinity of the junction of the flange 126 with the web 132 there is located a locus of flexure points 134, about which the web portion 132 is deflected axially in the direction of convergence of the sealing surface 15 of the valve closure member 14. Accompanying this axial deflection of the web portion 132 is hoop stretching of the inner sealing portion 130 to accommodate the closure member sealing surface 15, and this hoop stretching of the inner sealing portion increases the diameter of this portion, again placing the web portion 132 in radial compression. Under the influence of fluid differential pressure applied from the direction of convergence of the closure member surface 15, this radial compression of the web portion 132 cooperates with hoop stresses in the sealing portion 130 to maintain sealing engagement of the seal 124 with the closure member 14 by virtue of the axial displacement of the locus of flexure points 134 in the direction of convergence of the closure member surface 15 from the point of contact between the seal and the closure member, in the same manner as the embodiment of FIGS. 1-5.

Obviously, many modifications and variations to the valve seal arrangement described herein will occur to those skilled in the art in the light of the above teachings. For example, although we have illustrated and described preferred embodiments wherein this seal is employed in a butterfly valve, clearly such a seal may be employed in ball valves equally well. It is therefore to be understood that this invention may be practiced otherwise than as herein specifically described.

We claim:

1. A valve seal structure comprising:

a unitary metallic annular seal member having an inner sealing portion of generally U-shaped cross section, a resilient flexible web portion extending generally outwardly from said sealing portion, and an outer periphery extending outwardly from said web portion, and including a locus of flexure points at the junction of said web and said periphery;

a valve body having a central bore and means within said bore for sealingly engaging said periphery of said seal;

valve closure means pivotable within said bore between open and closed positions, said closure means having a circumferential sealing surface converging generally toward an axis of said body bore for sealingly engaging said sealing portion of said seal in an interference fit in a region of contact when said closure means is in a closed position;

said locus of flexure points being displaced in the direction of convergence of said sealing surface of said closure means from said region of contact between said seal member and said closure means, wherein said generally U-shaped cross section of said seal member sealing portion defines a center of curvature of said cross section, and wherein an imaginary line through said center of curvature of said U-shaped cross section and said locus of flexure points when said closure means is in the open position intersects said sealing surface of said closure means substantially perpendicularly when said closure means is in said closed position; and whereby upon pivoting of said closure means to said closed position, said inner sealing portion of said seal is radially stretched to accommodate said closure means, and said web portion is resiliently deflected axially and placed in generally outward compression.

2. A seal structure according to claim 1, wherein said line intersects said sealing surface within ten degrees of perpendicularly.

3. A seal structure according to claim 2, wherein said line intersects said sealing surface perpendicularly.

4. In a valve having a valve body, a central bore through said valve body, and disk retained within said bore and pivotable about an axis transverse to said bore between an open and a closed position for interrupting fluid flows through said valve over a range of differential pressures across said valve, a valve seal structure comprising:

a metallic annular seal member surrounding said bore and having a resilient inner sealing portion of generally U-shaped cross section, an outer flange portion retained in leak proof relationship with said valve body, an intermediate web portion linking said inner and outer portions, and a locus of flexure points between said web portion and said outer flange portion, said web portion being resiliently flexible axially about said flexure points; and converging surface means circumferentially disposed about said disk, and converging toward an axis of said central bore on one side of said disk, for engaging said inner portion of said seal in an interference fit in a region of contact when said disk is in the closed position;

said locus of flexure points being offset from said region of contact in the direction of convergence of said converging surface means;

wherein a line through said locus of flexure points and a center of curvature of said U-shaped cross section of said inner sealing portion when said disk is open intersects subtantially perpendicularly said surface means of said disk when said disk is in the closed position; and said converging surface means circumferentially stretching said inner sealing portion of said seal to accommodate said surface means, and axially deflecting said web portion upon closure of said disk, placing said web portion in generally outward compression.

5. A seal structure according to claim 4, wherein said converging surface means imparts outward compressive loading to said web portion when said disk is displaced axially by differential fluid pressure acting on said disk from either side, throughout said range of operating pressure differentials.

* * * * *